July 17, 1951  C. HETTINGER  2,560,864
MACHINE FOR MOLDING SOUR RYE DOUGH
Filed April 24, 1946  2 Sheets-Sheet 1
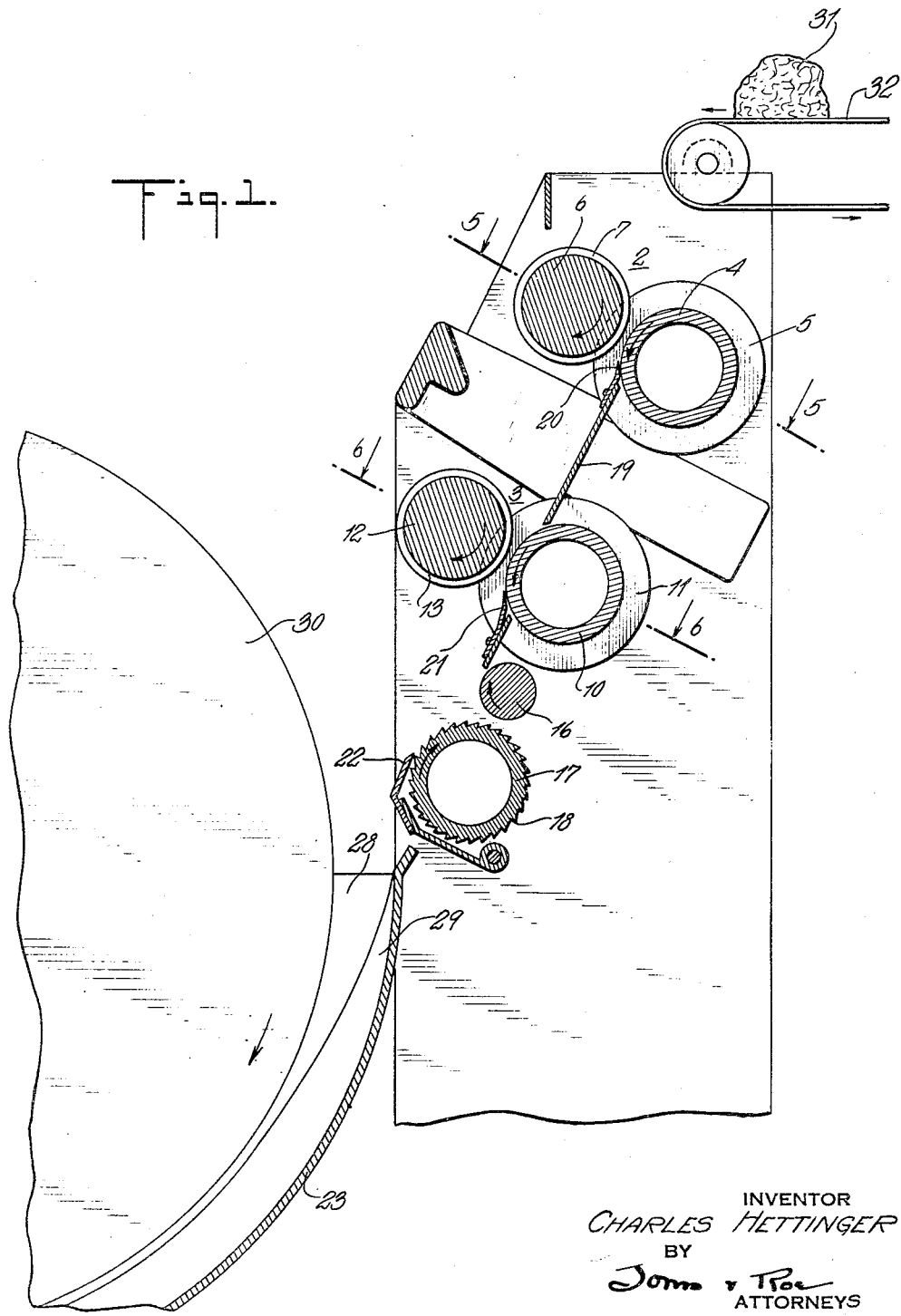
INVENTOR
CHARLES HETTINGER
BY
Jones & Roe
ATTORNEYS July 17, 1951 C. HETTINGER 2,560,864
MACHINE FOR MOLDING SOUR RYE DOUGH
Filed April 24, 1946 2 Sheets-Sheet 2
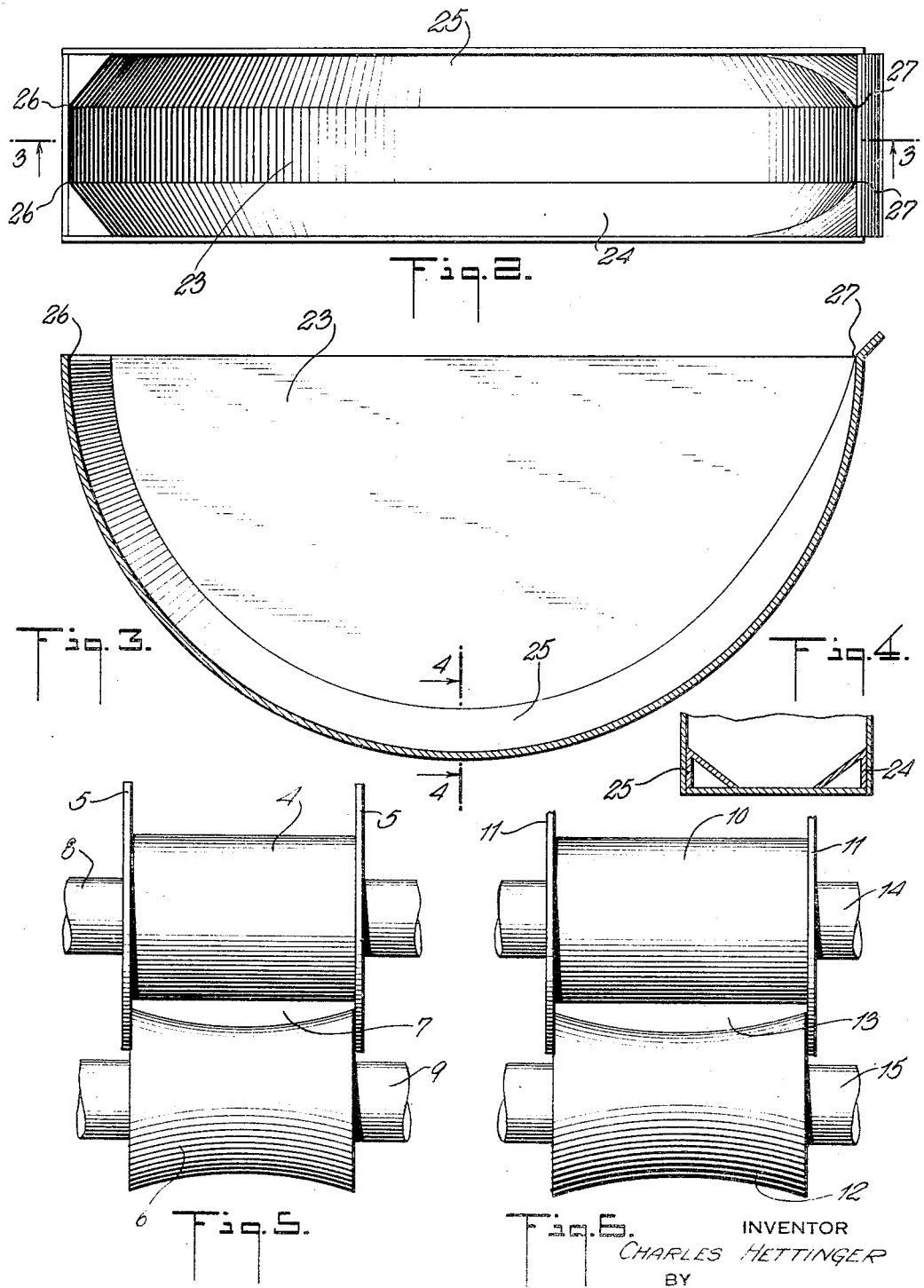
INVENTOR
CHARLES HETTINGER
BY
ATTORNEYS Patented July 17, 1951

2,560,864

UNITED STATES PATENT OFFICE 2,560,864

MACHINE FOR MOLDING SOUR RYE DOUGH

Charles Hettinger, West Englewood, N. J.

Application April 24, 1946, Serial No. 664,582

1 Claim. (Cl. 107—9)

My invention relates to a machine for moulding sour rye dough preparatory to baking.

In general, the invention comprises a suitable support, novel rollers for initially preforming the dough, and a rotatable drum operating in conjunction with a matrix trough whereby the dough is rendered in its final form.

More specifically, the invention comprehends the employment of structurally new types of rollers wherein a cylindrical surface operates against a concave surface and one roller of a pair of rollers is equipped with terminal flanges which overlap the ends of the adjacent roller and confine the dough against lateral displacement. One or more pairs of rollers may be used, and when the dough finally emerges from the rollers it passes on to a corrugated roller working in conjunction with a smaller intermediate roller, which latter two rollers serve to curl the dough into the approximate shape of the conventional sour rye loaf of bread. Thereafter, the dough is fed into a trough, the inside bottom wall of which is fashioned into a matrix, and here it is compressed into said matrix and picked up and carried out of the trough in final form, by a revolving drum.

One embodiment of my invention resides in the construction and arrangement of parts hereinafter described, illustrated in the accompanying drawings and embodied in the scope of the appended claim.

In the drawings:

Fig. 1 is a sectional elevation of the machine.

Fig. 2 is a top plan view of the trough.

Fig. 3 is a longitudinal section along lines 3—3 of Fig. 2.

Fig. 4 is a transverse section taken on lines 4—4 of Fig. 3.

Fig. 5 is an enlarged detail view of the upper pair of rollers, on lines 5—5 of Fig. 1, and Fig. 6 is a similar view of the lower pair of rollers on lines 6—6 of Fig. 1.

Referring more particularly to the drawings, the reference numeral 1 indicates a frame having at its upper extremity two pairs of rollers 2 and 3. The upper pair 2 comprises a cylindrical roller 4 provided with end annular flanges 5, and a roller 6 having a peripheral grove or concavity 7, the flanges overlapping and embracing opposite ends of roller 6, as clearly shown in Fig. 5. The rollers are mounted on shafts 8 and 9, respectively, which project from opposite sides thereof as best seen in Fig. 5 and together are disposed at a slight angle relative the frame.

Pair 3 consists of a cylindrical roller 10 equipped with annular flanges 11, and roller 12 with a peripheral grove 13. Shafts 14—15 serve as mountings, and extend from opposite sides of the rollers like in the companion set 2 and likewise are mounted in the side walls of the frame 1. The set-up and operation of these rollers are identical with the upper pair 2, with the exception that their width is greater—see Fig. 6. And they are located slightly forward and below the upper pair. The two sets of rollers 2 and 3 are driven by a chain or gearing, not shown.

The train of rollers is further augmented by a smaller roller 16, and a roller 17, similar in dimensions to the other larger rollers, but formed with a corrugated or fluted surface 18. Together these rollers 16—17 constitute curling rollers.

Between upper and lower pairs of rollers, a deflector 19 is disposed to direct the dough onto the succeeding pair of rollers. At its upper terminal the deflector carries a scraper 20. Scrapers 21 and 22 are also arranged at appropriate points in the lower extremity of the train.

Below roller 17 and in line with the train is a pressure trough 23. It is of semi-circular contour with the inner sides of its outer edges provided with shoulders 24—25 which taper from the receiving end towards the discharge end, as at 26—27, to present a matrix in the form of a standard loaf of sour rye bread. The shoulders may be formed of tapering inserts, angular in cross-section, which are soldered or otherwise suitably affixed to the corners of the trough— see Fig. 4. Near the mouth 28 of the trough, edges 24—25 are tapered as at 29 to permit the introduction of a suitable dough piece and cooperating with the trough is a compression drum 30.

The dough-piece 31 may be fed to the machine by an endless conveyor 32, or any other suitable means. As it passes between upper pair of rollers 2, revolving in opposite directions, it is sheeted into a semi-loaf shape. It then goes between the second pair of rollers 3, and emerges somewhat more attenuated, due manifestly to the greater width of these rollers. Thereupon the sheeted dough piece proceeds onto rollers 15 and 16 at which point it is curled by the clockwise rotation of said rollers into the approximate size and shape of a standard sour rye loaf. From this point, the dough-piece enters trough 21 where it is compressed into the matrix and carried out the opposite end of the trough in final form, ready for baking.

Rollers 4 and 10 may be provided with any suitable means for adjustment relative rollers 6 and 12, and a similar provision may be made for vertical adjustment of the matrix trough. Neither of these adjustments are shown.

During the aforesaid operation, the annular flanges of rollers 4 and 10 preclude lateral spreading of the dough-piece beyond the edges of the rollers; and the entire train of rollers, step by step, subjects the dough to thorough conditioning and provides in its ultimate size and shape a perfectly preformed loaf.

I claim:

A semi-circular dough trough adapted to coact with a revolving drum and underlying the bottom of same, said trough having a uniform rectangular cross-section to provide an arcuate bottom face concentric with said drum, and arcuate inserts disposed in the respective corners thereof and extending from one end of the trough to the other end, and tapering from the inlet end of the trough toward the discharge end thereof, said inserts providing oppositely inclined faces extending from the bottom face of the trough to the side walls thereof, whereby said faces coact with the drum to shape a dough piece inserted in the inlet end of the trough.

CHARLES HETTINGER.

REFERENCES CITED

The following references are of record in the file of this patent:

UNITED STATES PATENTS

| Number | Name | Date |
|---|---|---|
| Re. 20,516 | Kirchhoff | Sept. 21, 1937 |
| 710,646 | Thomson | June 3, 1902 |
| 846,790 | Hueg | Mar. 12, 1907 |
| 875,930 | Hueg | Jan. 7, 1908 |
| 953,177 | Parsons et al. | Mar. 29, 1910 |
| 1,827,958 | Sisson | Oct. 20, 1931 |
| 2,014,183 | Lea | Sept. 10, 1935 |
| 2,246,949 | Parsons | June 24, 1941 |